Oct. 13, 1964 J. N. MERNER ETAL 3,153,225

DATA PROCESSOR WITH IMPROVED SUBROUTINE CONTROL

Filed April 10, 1961 5 Sheets-Sheet 1

INVENTORS.
JACK N. MERNER
WILLIAM A. LOGAN
GEORGE CLARK OLIPHINT
BY
Christie, Parker & Hale
ATTORNEYS.

Oct. 13, 1964 J. N. MERNER ETAL 3,153,225

DATA PROCESSOR WITH IMPROVED SUBROUTINE CONTROL

Filed April 10, 1961 5 Sheets-Sheet 2

INVENTORS.
JACK N. MERNER
WILLIAM A. LOGAN
GEORGE CLARK OLIPHINT
BY Christie, Parker & Hale
ATTORNEYS.

INVENTORS.
JACK N. MERNER
WILLIAM A. LOGAN
GEORGE CLARK OLIPHINT
BY
Christie, Parker & Hale
ATTORNEYS.

INVENTORS.
JACK N. MERNER
WILLIAM A. LOGAN
GEORGE CLARK OLIPHINT
BY Christie, Parker & Hale
ATTORNEYS.

United States Patent Office 3,153,225

Patented Oct. 13, 1964

3,153,225

DATA PROCESSOR WITH IMPROVED SUBROUTINE CONTROL

Jack N. Merner, Azusa, William A. Logan, Covina, and George Clark Oliphint, Sierra Madre, Calif., assignors to Burroughs Corporation, Detroit, Mich., a corporation of Michigan Filed Apr. 10, 1961, Ser. No. 101,958
12 Claims. (Cl. 340—172.5)

Figure 1:
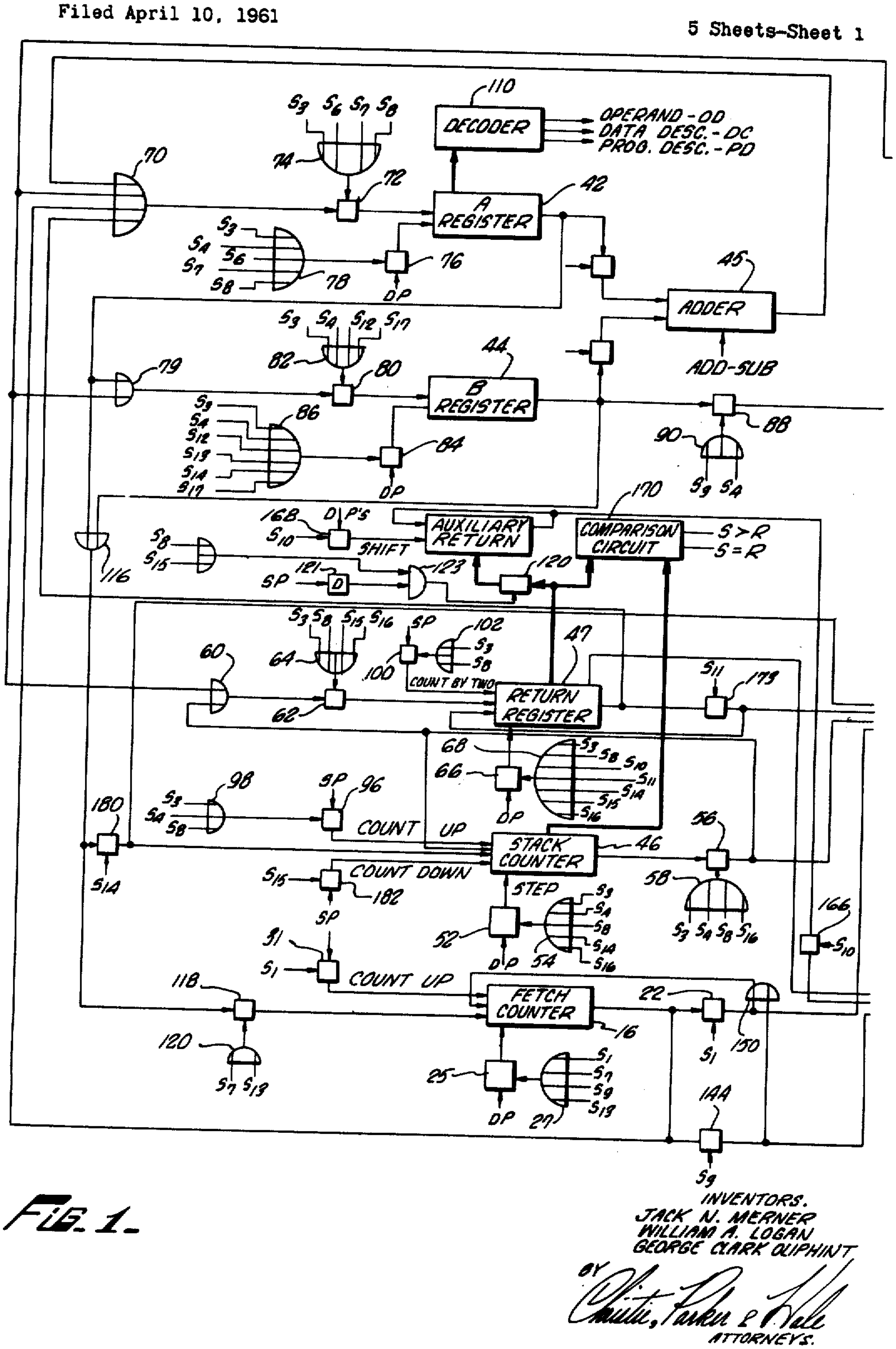

This invention relates to electronic digital processors, and more particularly, is concerned with an electronic digital computer having improved subroutine control.

The use of subroutines in computer programming is well known. A subroutine consists of a group of instructions which perform a frequently recurring computation such as the calculation of a trigonometric function, a square root, etc. Rather than insert the instructions for such an operation in the main program, the group of instructions are separately stored and an instruction is provided in the main program which causes the computer to jump to a specified subroutine. After executing the instructions of the subroutine, the computer returns to the main program.

A subroutine may itself require another subroutine as one step in its computation. The computer must then be able to jump from the higher order subroutine to this lower order subroutine and on its completion return to the higher order subroutine. This is referred to as nesting of subroutines.

In order that a generalized library of subroutines be useful, the instructions of the subroutine should contain addresses that do not go outside the space in memory set aside for storage of the particular subroutine. This insures that the addresses need not be changed each time the subroutine is used. To accomplish this, each subroutine must include storage for parameters and working storage for intermediate results which can be addressed by the subroutine instructions.

The present invention is directed to a computer incorporating a unique facility for executing subroutines. The invention permits unlimited nesting of subroutines. It further permits the use of recursive subroutine operation, that is, a subroutine which enters itself as a lower order subroutine and exits back into itself as the next higher order subroutine without returning to the main program. This ability of a subroutine to reference itself as a lower order subroutine and to do this an indefinite number of times, then exit from each lower subroutine back into itself as a higher order subroutine, permits the computer to solve problems which could not be done before or could only be done by very complicated and roundabout programming.

In addition to providing a straightforward way of providing nesting of subroutines and providing for recursive subroutines, the present invention avoids the need for setting aside memory space with each stored subroutine for entry of parameters. A dynamic parameter bit is provided when subroutine operation is initiated from which parameters are addressable during any subroutine. Parameters are available from the bit, carried in temporary storage, during lower order subroutines as well. As a result, each subroutine does not need to include temporary storage space for parameters to be filled in at the time the subroutine is entered. This greatly reduces the amount of memory space required for storage of subroutines in the storage facility of the computer.

In brief, these and other advantages of the present invention are achieved in an internally stored computer in which program control signals are normally stored in sequential locations of an addressable memory. The computer includes apparatus for automatically introducing stored subroutines in which the program control signals for each subroutine are stored in sequential locations of the memory starting with a designated base address location. The apparatus comprises a program register to which program control signals are transferred in sequence from the addressable memory in response to a program fetch counter. A temporary storage facility having a plurality of storage locations and a bidirectional counter for addressing the locations sequentially has first and second associated registers. First control means causes transfer of signals from the first register to the second register and from the second register to the storage location specified by the counter, the counter being counted up one. Second control means causes the counter to be counted down one and the signals stored in the location specified by the counter to be transferred back to the second register. A return-point register is settable from the bidirectional counter.

Entry to a subroutine is flagged by a control signal in the program register which causes the contents of the return-point register to be placed in the first register of the temporary storage facility, the first control means being activated to transfer the contents of the first register to the second register and the contents of the second register into the storage location specified by the bidirectional counter. The return-point register is loaded from the bidirectional counter.

Subsequent control signals loaded in the program register cause operands to be transferred from memory to the temporary storage facility through the first register to provide a parameter bit. Operation is then switched to the subroutine when a special descriptor word is encountered in the first register rather than an operand. The descriptor word contains the base address of the subroutine. Control means transfers this address to the program fetch counter. At the same time, the contents of the return-point register and the previous contents of the fetch counter are placed in the first register of the storage facility, replacing the descriptor word. The return-point register is reset from the contents of the bidirectional counter of the storage facility.

The fetch counter now places the control signals of the subroutine sequentially in the program register, which controls the execution of the subroutine. The parameters are now in predetermined locations in temporary storage so they can be independently referenced by generalized address information stored in the subroutine.

The last control signal of the subroutine causes the fetch counter to be reloaded with the value stored in the temporary storage facility and the bidirectional counter and return-point register to be restored to the values that were stored in the temporary storage facility during the subroutine entry operation, thereby restoring the computer to its condition prior to the subroutine operation. The result of the subroutine remains in the first register of the temporary storage facility to be used as an operand.

Figure 2:
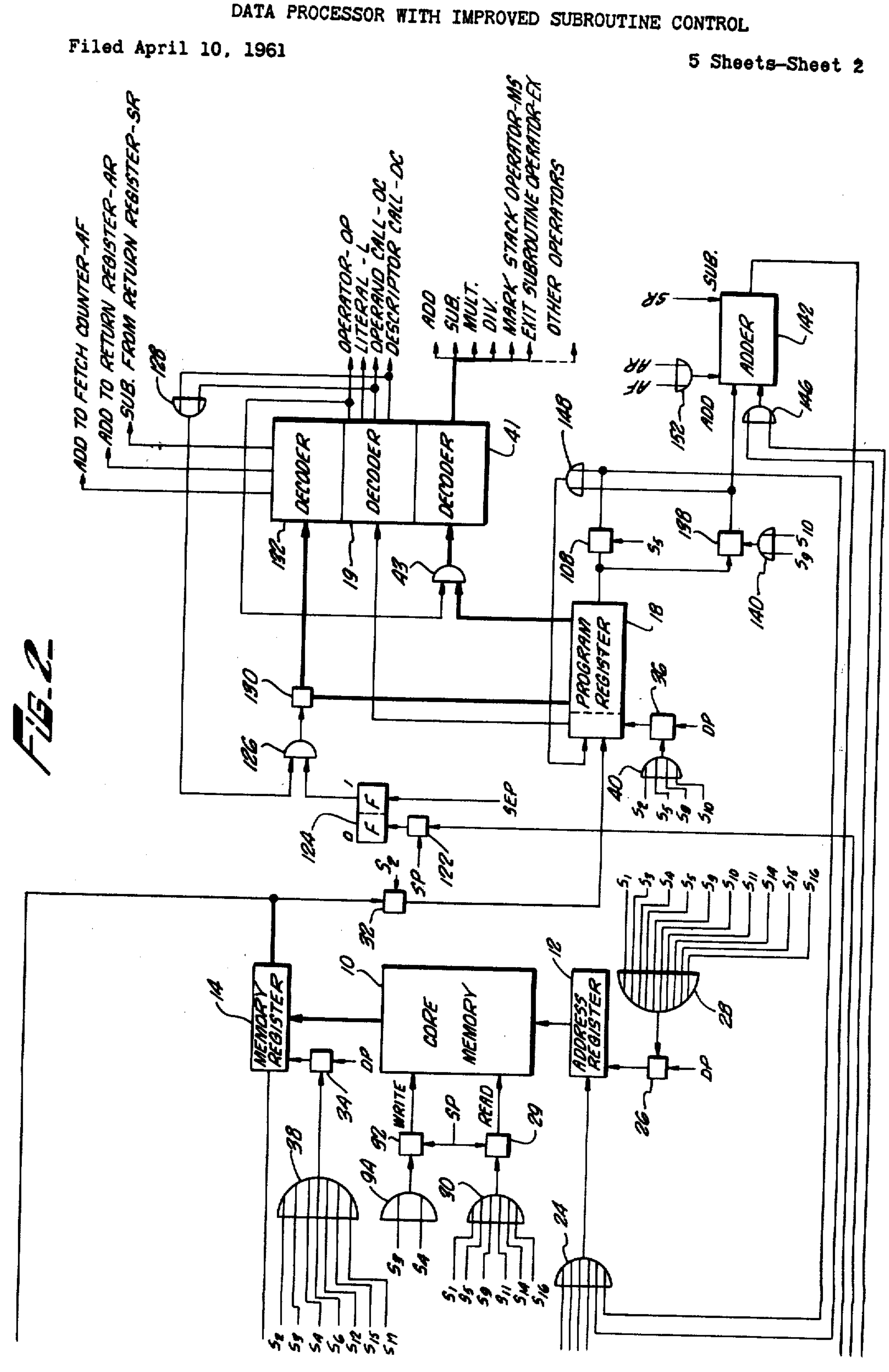
Figure 3:
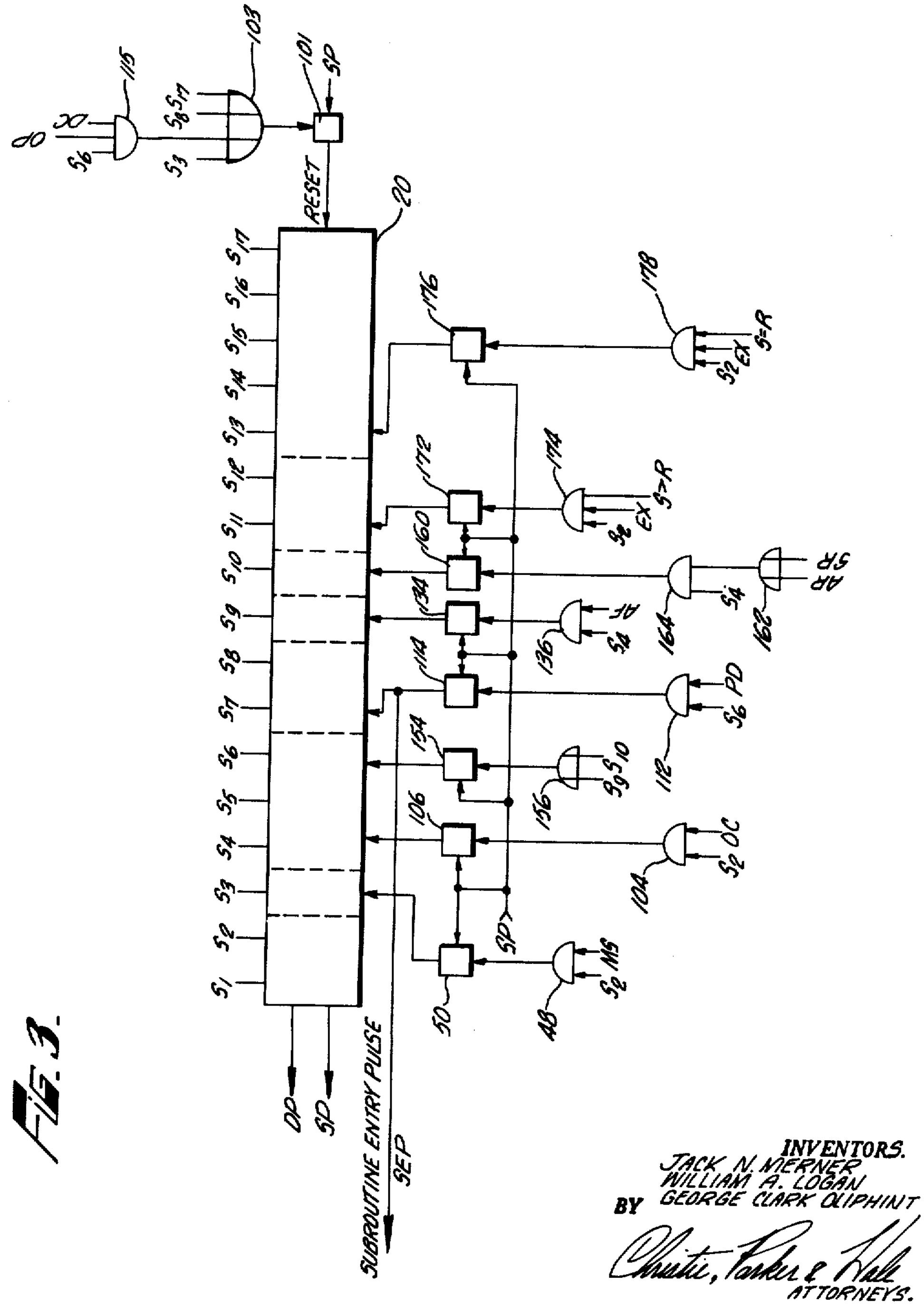
Figure 5A:
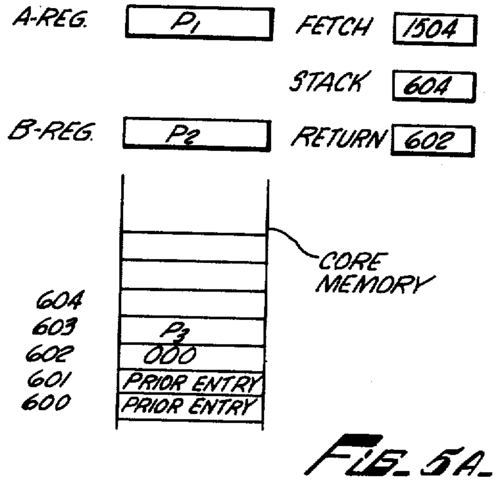
Figure 5B:
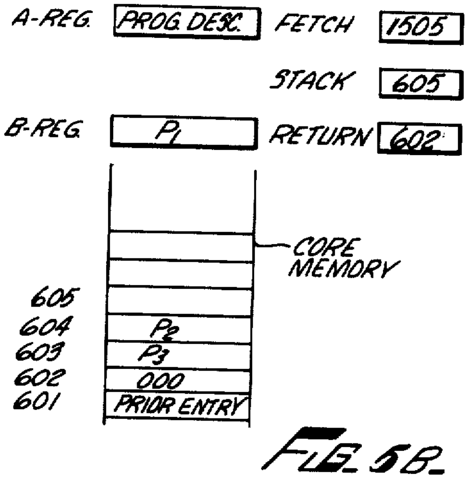
Figure 5C:
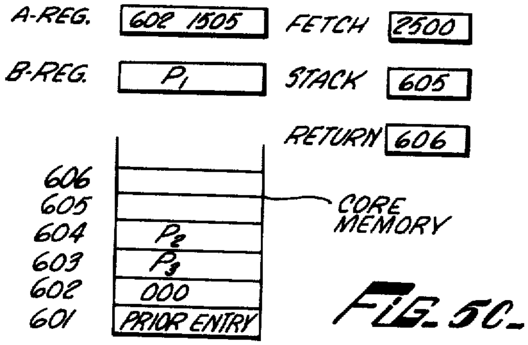
Figure 6A:
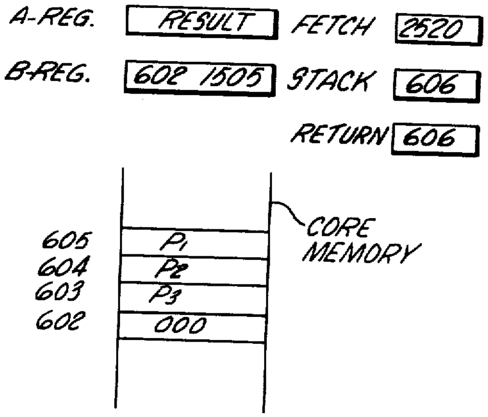
Figure 6B:
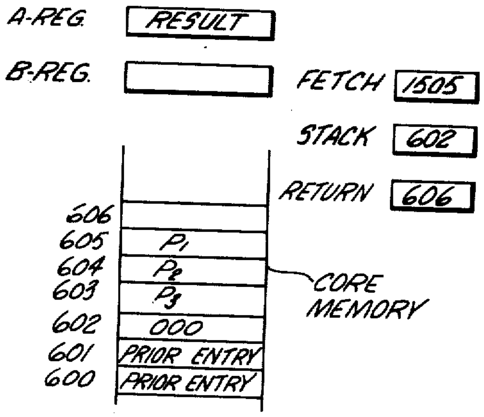
Figure 6C:
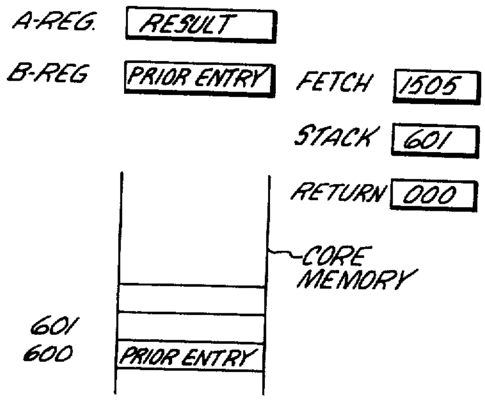

For a more complete understanding of the invention reference should be made to the accompanying drawings, wherein:

FIGURES 1, 2, and 3 together are a schematic block diagram of one embodiment of the present invention; and FIGURES 4, 5, and 6 are charts illustrating various operating conditions of the computer of the present invention.

In copending application Serial No. 84,156, filed January 23, 1961, in the name of Paul D. King and Robert S. Barton and assigned to the assignee of the present invention, there is described a digital computer which executes a string of internally stored program syllables. These program syllables are arranged ot either call forth operands from memory, introduce constants, or to initiate specified arithmetical or logical operations. As operands are called out of memory, they are placed in a temporary storage referred to as a "stack" memory. The arithmetic unit is arranged to operate on the last two operands inserted into the stack memory, with the result of the arithmetic operation automatically replacing the last operand placed in the stack. At the same time, the next to last operand is replaced by an operand derived from the next lower position in the stack memory. The word "stack" is used to connote the function of this unit. The way the stack memory operates, it can be thought of as a stack of temporarily stored words placed one on top of the other in the order received. The words are automatically available from the top of the stack in the reverse order in which they are put in the stack. The preferred embodiment of the present invention is incorporated in a computer of this type.

The program of the computer described in the above-mentioned copending application consists of a string of program syllables which may be of four types. One type of syllable, hereinafter called an Operator syllable, initiates some arithmetical or logical operation such as an addition, a subtraction, or the like. The second type of syllable, hereinafter called a Literal syllable, acts to place itself in the stack memory, as a constant for example. A third type of syllable is normally used to place operands in the top of the stack and is hereinafter referred to as an Operand Call syllable. A fourth type of syllable hereinafter referred to as a Descriptor Call syllable, is used to plate address information in the stack in the form of various types of Descriptor words. The various types of Descriptor words provide information for locating and indexing arrays of data, transferring information from specified address locations in memory to specified input and output devices used in conjunction with the processor, or, as hereinafter described in more detail, providing the base address of generalized subroutines stored in memory.

Referring now to the drawings in detail, the numeral 10 (see FIG. 2) indicates generally a random access memory, such as a magnetic core memory, in which binary coded words are stored in addressable memory locations. The memory locations are selected by binary coded addresses stored in an Address register 12. Binary coded information words are transferred into and out of specified memory locations in the core memory 10 through an input/output Memory register 14. Transfer is from a specified memory location to the register 14 or from the register 14 to the specified address location and is initiated by a pulse on one or the other of two inputs, designated respectively the "Write" input and the "Read" input. Addressable core memories of this type are well known in the computer art. See, for example, the book "Digital Computer Components and Circuits" by R. K. Richards, D. van Nostrand Company, 1957, chapter 8.

A portion of the core memory 10 is allocated to the storage of the program syllables, which are stored in consecutive memory locations and are transferred from memory in consecutive order by means of a Fetch counter 16. See FIG. 1. The counter 16 is initially set to a value corresponding to the address location of the first program syllable in memory and then is caused to be counted up one each time a program syllable is transferred out of memory. Each time a program syllable is to be transferred out of the core memory, the contents of the Fetch counter 16 are transferred to the Address register 12. It should be noted that since serial operation is assumed throughout in which information is transferred character by character between registers, the counter 16 is also arranged as a shift register so that its contents can be shifted from the counter 16 serially into the register 12. However, it should be understood that while serial operation is given by way of example, the invention is equally applicable to parallel operation.

Each program syllable read out of the core memory 10 is transferred from the Memory register 14 to a Program register 18. See FIG. 2. It is while in the Program register 18 that the syllable is decoded to determine which type of syllable it is so that the computer can be controlled accordingly. Each program syllable contains two bits for designating it as one of the four types of syllables. After a program syllable is placed in the Program register 18, these two binary bits are sensed and applied to a decoder 19 which energizes one of four output lines, designated Operator—OP, Literal—L, Operand Call—OC, and Descriptor Call—DC, depending upon which of the four syllable types is being stored in the Program register 18. The Operator syllables, the Literal syllables, the Operand Call syllables, and the Descriptor Call syllables respectively produce, for example, a high voltage level on the line OP, the line L, the line OC, or the line DC as the case may be.

A central control unit 20 (see FIG. 3) functions to cause the individual units of the computer to perform in such a manner that program syllables are fetched in the proper sequence, decoded and executed as required. A suitable control unit is described in detail in copending application Serial No. 788,823, filed January 26, 1959, now U.S. Patent No. 3,001,708 in the name of Edward L. Glaser and assigned to the assignee of the present invention. The central control unit 20 includes a counter (not shown) arranged to be stepped through a succession of states, to be set to any selected state, or be reset. Only seventeen states are shown in the figures, designated $S_1$ through $S_{17}$, since these are the only states required to carry out the particular functions with which the present invention is directly related. The central control unit 20 is further arranged to generate a predetermined number of digit pulses, designated DP's, while in each state, each group of DP's being followed by one step pulse, designated SP. The generation of the SP normally causes the counter of the central control unit to advance to the next state.

The $S_1$ and $S_2$ states of the central control unit are common to all syllable executions and are used to control the fetch operation of the next syllable in the core memory. To this end, the $S_1$ state is applied to a gate 22 (see FIG. 1) on the output of the Fetch counter 16, permitting transfer of the contents of the Fetch counter 16 through a "logical or" circuit 24 (see FIG. 2) into the Address register 12. The $S_1$ state also opens a gate 25 (see FIG. 1), permitting DP's to be applied to the shift input of the Fetch counter 16, the number of DP's generated during the $S_1$ state being just sufficient to transfer a complete address from the Fetch counter 16 to the Address register 12. DP's are also applied through a gate 26 (see FIG. 2) to the shift input of the Address register 12 in response to the $S_1$ level applied to the gate 26 through a "logical or" circuit 28. After the required number of DP's are generated to shift the contents of the register 16 into the Address register 12, the following SP sets the central control unit 20 to the $S_2$ state.

The same SP generated at the end of the $S_1$ state is also applied to the "Read" input of the core memory 10 by means of a gate 29 which is biased open by the $S_1$ level applied through a "logical or" circuit 30. As a result, the addressed word in the core memory 10 is read into the Memory register 14 at the end of the $S_1$ state. At the same time, the SP is used to counter up the Fetch couner 16 by applying it to a gate 31 which is open during the $S_1$ state. In this way, the Fetch counter is advanced to the address location of the next program syllable in the program string stored in the memory.

During the $S_2$ state, a gate 32 (see FIG. 2) is open, permitting transfer of the program syllable from the Memory register 14 to the Program register 18. DP's are applied to the shift inputs of the two registers through gates 34 and 36 respectively. The high level of the $S_2$ state is applied to these gates through "logical or" circuits 38 and 40 respectively. In this way, the program syllable is transferred into the Program register 18 where the syllable type is decoded by means of the decoder 19.

After the program syllable has been transferred to the Program register 18, execution of the syllable is initiated through operation of the central control unit 20. If the syllable is an Operator syllable, the remaining bits in the Operator syllable are applied to a decoder 41 through a "logical and" circuit 43. The OP line from the decoder 19 is also applied to the "logical and" circuit 43 so that the decoder 41 is activated only in response to an Operator syllable in the Program register 18.

The decoder 41 energizes any one of a plurality of output lines, one line being energized for each particular pattern of bits in the Program register 18. Shown by way of example are the output lines for the addition operation, subtraction, multiplication, division, and in particular two operators which are used to effect subroutine control, namely, a Mark Stack operator, abbreviated MS, and an Exit Subroutine operator, abbreviated EX. The other syllable types in a manner described in the above-mentioned copending application Serial No. 84,156, place operands or descriptors stored in the core memory 10 into the top of the stack memory.

In the particular embodiment shown in the drawings, the stack memory includes a portion of the core memory 10 designated by a Stack counter 46. See FIG. 1. In addition, the stack consists of an A-register 42. Normally, an operand is placed in the top of the stack by inserting it in the A-register 42. The operand is moved down in the stack by transferring it from the A-register 42 to the B-register 44 and from the B-register into the memory location in the core memory 10 designated by the Stack counter 46. Each time an operand is placed in the core memory 10, the Stack counter 46 is counted up one. Whenever an operand is removed from the core memory 10, the Stack counter is first counted down one so that it corresponds to the location of the last operand to be placed in the core memory portion of the stack. In this way, the stack portion of the core memory is always addressed on the basis of the last operand in being the first operand out.

Arithmetic operations are done on the contents of the A-register and the B-register of the stack memory. Thus the output of the A-register and the B-register may be gated to the inputs of an adder 45 with the output of the adder being inserted back into the A-register 42. The add operator cycle is described in detail in the above-mentioned copending application Serial No. 84,156.

It will be seen that in the computer circuit as thus far described, a string of syllables comprising the main program for carrying out a problem on the computer are executed in sequence by control of the Fetch counter 16 which brings the program syllables out of the core memory 10 into the Program register 18 in sequence. Each syllable type is executed so as to place operands in the stack in response to Operator Call syllables, and to perform arithmetic computations on the contents of the two registers forming the top of the stack memory, placing the result back in the top of the stack in response to Operator syllables.

In order to introduce subroutines into the program, control is transferred from the main program mode of operation to a subroutine mode and then automatically returned to the main program upon completion of the subroutine. The subroutine mode is designed so that generalized subroutines, whose parameters are likely to change with each use, may be incorporated with a main program efficiently. In order that the subroutines can be made independent of specific address locations of parameters stored in memory, the parameters are loaded into the temporary storage provided by the stack memory prior to entering the subroutine mode. To delineate the portion of the stack used for parameters from portions of the stack used during execution of the subroutine, a Mark Stack operator syllable is used to store a return-point address for the Stack counter. This address is derived from the Stack counter 46 and is stored in a Return register 47. At the same time, the address in the Return register 47 is stored in the stack memory. This arrangement, as will hereinafter become apparent, permits the parameters to be eliminated from the stack when exiting from the subroutine.

To effect the subroutine entry, a Mark Stack operator is placed in the Program register 18 by the operation carried out through the $S_1$ and $S_2$ states of the central control unit 20. The decoder 41 in the case of a Mark Stack operator produces a high level indication on the line MS at the output of the decoder 41. The MS line is applied to a "logical and" circuit 48 (see FIG. 3) along with the $S_2$ state, and if both conditions are true, a gate 50 is biased open, permitting the SP generated at the end of the $S_2$ state to set the central control unit 20 to the $S_3$ state. The $S_3$ state provides control for carrying out the Mark Stack operator.

During the $S_3$ state, shift pulses are applied to the Stack counter 46 through a gate 52 which is biased open by the $S_3$ line through a "logical or" circuit 54. At the same time, a gate 56 on the output of the Stack counter 46 is biased open during the $S_3$ state through a "logical or" circuit 58. The output from the gate 56 is connected to the input of the Return register 47 through a "logical or" circuit 60 and a gate 62 which is biased open during the $S_3$ state through a "logical or" circuit 64. At the same time, shift pulses are applied to the Return register 47 through a gate 66 biased open during the $S_3$ state through a "logical or" circuit 68. The contents of the Stack counter 46 are also applied through the gate 56 back to the input of the Stack counter 46 so that the contents are not lost. At the same time, the contents of the Stack counter 46 are transferred to the Address register 12 through the "logical or" circuit 24 by means of shifting pulses applied through the gate 26 which is biased open by the $S_3$ state applied through the "logical or" circuit 28.

While the contents of the Stack counter 46 are transferred into the Return register 47, the contents of the Return register 47 are transferred into the A-register 42. Thus the output of the Return register 47 is coupled through a "logical or" circuit 70 through a gate 72 to the input of the A-register 42. The gate 72 is biased open during the $S_3$ state through a "logical or" circuit 74. At the same time, shift pulses are applied to the A-register 42 by means of a gate 76 which is biased open during the $S_3$ state through a "logical or" circuit 78. In this manner, after a predetermined number of DP's have been generated by the central control unit 20, the contents of the Stack counter 46 are transferred to the Return register 47, and the contents of the Return register 47 are transferred to the Address register 12. Also the contents of the Return register 47 are transferred to the A-register 42.

To make room for the contents of the Return register 47 to be placed in the A-register 42, the stack memory must be in effect pushed down, necessitating the transfer of the contents of the A-register 42 to the B-register 44, and the contents of the B-register into the core memory 10. This is accomplished by connecting the output of the A-register 42 to the input of the B-register 44 through a "logical or" circuit 79 and a gate 80 which is biased open during the $S_3$ state through a "logical or" circuit 82. At the same time, shift pulses are applied to the B-register 44 through a gate 84 biased open during the $S_3$ state through a "logical or" circuit 86. Also the contents of the B-register are transferred through a gate 88 in the Memory register 14, the gate 88 being biased open by applying the $S_3$ state through a "logical or" circuit 90. Shift pulses are transferred to the Memory register 14 by applying the $S_3$ state through the "logical or" circuit 38 to the gate 34.

The SP generated at the end of the $S_3$ state transfers the contents of the Memory register 14 into the core memory 10, the SP being passed by a gate 92 (see FIG. 2) biased open by the $S_3$ state through a "logical or" circuit 94. The SP from the gate 92 is applied to the "Write" input of the core memory 10. The same SP counts the Stack counter 46 up one to correspond to the next memory location in the stack portion of the core memory 10. To this end, an SP is passed by a gate 96 to the Count Up input of the Stack counter 46, the gate 96 being biased open by the $S_3$ state applied through a "logical or" circuit 98.

It should be noted that it is desirable that the contents of the Return register 47 indicate the location in which the previous contents of the Return register are now stored in the stack. Since the number transferred into the return register 47 from the Stack counter 46 corresponds to the location of the last item to be placed in the core memory 10, the Return register 47 must be counted up two so as to correspond to the location of the contents of the Return register as stored in the stack, namely, the A-register 42. To this end, an SP is applied through a gate 100 to the Count-by-Two input to the Return register 47. The gate 100 is biased open by applying the $S_3$ state through a "logical or" circuit 102. In this manner, the number stored in the Return register 47 is automatically advanced by two. The number in the Return register now corresponds to the location in the core memory 10 where the contents of the A-register will be stored when the stack is pushed down twice.

The SP generated at the end of the $S_3$ state resets the central control unit 20 back to the $S_1$ state to fetch the next program syllable. This is accomplished by a gate 101 which passes the SP to the reset input of the central control unit 20. The gate 101 is biased open during the $S_3$ state through a "logical or" circuit 103.

Figure 4A:
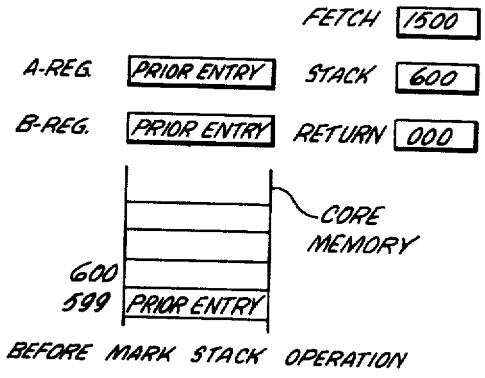
Figure 4B:
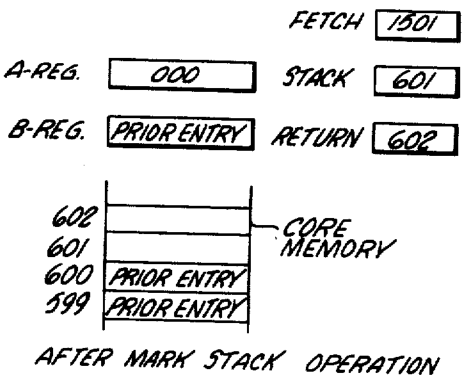

To better understand the Mark Stack operation, reference should be made to FIGURE 4 which shows an example of the condition of the various registers and the stack memory before the Mark Stack operation (see FIG. 4A) and after the Mark Stack operation (see FIG. 4B). During operation in the main program the Return register 47 normally contains zero. The Stack counter contains the location in the stack memory of the next location to be used. In this case, since the previous entry was in address location 599, the Stack counter contains the number 600. Both the A and B-registers contain information entered during the main program. The Fetch counter contains the address of the next program syllable.

Referring to FIG. 4B, after the Mark Stack operator is encountered, the stack memory in effect is pushed down so that the contents of the A-register are now transferred to the B-register and the contents of the B-register are now transferred to the location 600 designated by the Stack counter. At the same time, the contents 000 of the Return register are transferred to the A-register. The Stack counter is counted up one to 601, corresponding to the next location to be used in the stack memory and the Return register is counted up two to 602 from the previous value stored in the Stack counter. It will be noted that the contents of the Return register now corresponds to the address location in which the 000 stored in the A-register will eventually be placed in the core memory portion of the stack memory.

After completion of the Mark Stack operation, parameters necessary for the subroutine are placed in the stack. This may be done by using Operand Call syllables to transfer operands or data descriptors from memory to the A-register 42 in the manner described in detail in the above-mentioned copending applications. Once the necessary parameters are placed in the stack, entry is made to the subroutine by an Operand Call syllable which references a program descriptor word in memory. A program descriptor word differs from an operand word in that special bits in the word identify it as a program descriptor and other bits in the word provide the base address in memory of the particular subroutine to be executed.

To effect a subroutine entry, during the Fetch operation comprising the $S_1$ and $S_2$ states, an Operand Call syllable is placed in the Program register 18. The Operand Call syllable produces a high level on the OC line at the output of the decoder 19 which is applied to a "logical and" circuit 104 (see FIG. 3) together with the $S_2$ state. If both conditions are true, a gate 106 is biased open passing the SP generated at the end of the $S_2$ state to set the central control unit 20 to the $S_4$ state.

During the $S_4$ state, the stack is pushed down, so the contents of the A-register 42 are shifted to the B-Register 44. To this end, DP's are applied to the shifting input of the A-register by biasing open the gate 76 during the $S_4$ state, DP's are applied through the gate 84 to shift the B-register 44 and the gate 80 is biased open. Also the contents of the B-register are shifted to the Memory register 14 by opening the gate 88 during the $S_4$ state and biasing open the gate 34 to apply shift pulses to the Memory register 14. Also the contents of the Stack counter 46 are transferred to the Address register 12 by biasing open the gate 56 as well as the gate 52 for applying shift pulses to the counter 46 and the gate 26 to apply shift pulses to the Address register 12. At the end of the $S_4$ state, the SP is passed through the gate 92 causing the contents of the Memory register 14 to be written into the core memory 10. Also the Stack counter 46 is counted up one by the SP passed by the gate 96. The same SP advances the central control unit 20 to the $S_5$ state.

During the $S_5$ state, the address portion of the Operand Call syllable stored in the Program register 18 is transferred to the Address register 12. To this end, DP's are applied through the gate 36 which is biased open during the $S_5$ state for shifting the Program register 18. A gate 108 couples the output of the Program register 18 to the input of the Address register 12 when the gate is biased open during the $S_5$ state. Also shift pulses are applied to the Address register 12 by means of DP's passed by the gate 26. At the end of the $S_5$ state, an SP is passed by the gate 29 to the "Read" input of the core memory 10, transferring the selected word from the core memory 10 into the Memory register 14. The same SP advances the central control unit 20 to the $S_6$ state.

During the $S_6$ state, the contents of the Memory register 14 are transferred into the A-register 42. To this end, shift pulses are applied through the gate 34 during the $S_5$ state to shift the Memory register 14. Also pulses are applied to the gate 76 to shift the A-register 42 and the gate 72 is biased open to permit transfer of signals between the Memory register 14 and the A-register 42.

Once the selected word is transferred to the A-register 42, a decoder 110 senses identification bits in the A-register 42 to determine if the word is an operand or a descriptor, and, if a descriptor, to determine whether it is a data descriptor or a program descriptor. Further operation of the computer in the event that an operand or a data descriptor word is transferred to the A-register 42 has been described in detail in the above-mentioned copending application Serial No. 84,156. Assuming that it is desired that a subroutine entry be effected, the word transferred to the A-register 42 will be a program descriptor, in which event the decoder 110 produces a high level on a program descriptor output line, designated PD.

The program descriptor line PD is applied to a "logical and" circuit 112 (see FIG. 3) together with the $S_6$ state. If both conditions are true, a gate 114 is biased open passing the SP generated at the end of the $S_6$ state. The pulse passed by the gate 114 is used to set the central control unit 20 to the $S_7$ state. The $S_7$ state and the following $S_8$ state are used only for subroutine entry resulting when an Operand Call syllable has placed a program descriptor in the A-register 42. If other than a program descriptor is placed in the A-register 42, the central control unit 20 is reset. For this reason the OC and DC lines from the decoder 110 are applied to a "logical and" circuit 115 together with the $S_6$ line. As a result, the gate 101 is biased open and an SP resets the control unit.

During the $S_7$ state, the contents of the Fetch counter 16 are replaced by address information carried as part of the program descriptor. In this manner, the base address of the subroutine program is placed in the Fetch counter so that the syllable string comprising the subroutine may be transferred in sequence from the core memory 10 into the Program register 18.

To accomplish this, during the $S_7$ state, the output of the A-register 42 is coupled to the input of the Fetch counter 16 through a "logical or" circuit 116 and a gate 118. The gate 118 is biased open during the $S_7$ state through a "logical or" circuit 120. At the same time, the output of the Fetch counter 16 is coupled to the input of the A-register 42 through the "logical or" circuit 70 and the gate 72. The gate 72 is biased open by applying the $S_7$ state through the "logical or" circuit 74. At the same time, DP's are coupled as shift pulses to the A-register 42 and the Fetch counter 16 respectively through the gates 76 and 25 which are biased open by applying the $S_7$ state to the "logical or" circuits 78 and 27 respectively. Thus at the end of the $S_7$ state, the address portion of the program descriptor in the A-register 42 is transferred to the Fetch counter 16 and the address of the next program syllable in the main program string is transferred into the temporary storage facility provided by the stack memory. The central control unit 20 is then automatically advanced to the $S_8$ state.

During the $S_8$ state, the contents of the Stack counter 46 are transferred to the Return register 47, and the contents of the Return register 47 are placed in the A-register 42 along with the previously stored contents of the Fetch counter 16. To this end, the gate 56 is biased open by applying the $S_8$ state through the "logical or" circuit 58 and the gate 62 is opened by applying the $S_8$ state through the "logical or" circuit 64. Also the gate 72 is biased open by applying the $S_8$ state through the "logical or" circuit 74. At the same time, shift pulses are applied through the gate 52 by means of the $S_8$ state applied through the "logical or" circuit 54, and the shift pulses are applied to the Return register 47 through the gate 66 which is biased open by applying the $S_8$ state through the "logical or" circuit 68. Pulses are applied to the shift input of the A-register 42 through the gate 76 which is biased open by applying the $S_8$ state through the "logical or" circuit 78. The SP generated at the end of the $S_8$ state is used to reset the central control unit 20 by applying the $S_8$ state to the gate 101 through the "logical or" circuit 103. The SP also steps the Stack counter 46 up one through the gate 96 and advances the Return register 47 by two through the gate 100.

The SP generated at the end of the $S_8$ state is also used to set the contents of an Auxiliary Return register 119 to the value stored in the Return register 47. The two registers 47 and 119 are connected in parallel through a gating circuit 120 which is pulsed by the SP. In order that the Return register can be advanced by two by the same SP, a delay circuit 121 is provided. The delayed SP is coupled along with the $S_8$ state to a "logical and" circuit 123, the output of which pulses the gating circuit 120 to set the Auxiliary Return register 119 to the same condition as the Return register 47. It will be noted that the Auxiliary Return register 119 is set only in response to a subroutine entry operation and is not set in response to a Mark Stack operator, whereas the Return register 47 is changed to the stack address in both these instances. The function of the Auxiliary Return register will be described below in detail in connection with operation of the computer during the subroutine mode.

Operation of the subroutine entry can be better understood by reference to FIGURE 5 which shows an example of the condition of the registers and the stack portion of the core memory 10 prior to the subroutine entry in FIG. 5A, after the first stage of the subroutine entry following the $S_6$ state in FIG. 5B, and the condition after the subroutine entry is completed in FIG. 5C. Thus assuming three parameters, $P_1$, $P_2$ and $P_3$, have been inserted in the stack following the Mark Stack operation shown in FIGURE 4, the Fetch counter 16 has advanced to 1504, the Stack counter 46 has advanced to 604, and the Return register 47 has remained at 602. The three parameters are respectively in location 603, the B-register, and the A-register of the stack memory. Following the first stage of the subroutine entry, a program descriptor is now placed in the A-register and the stack has been pushed down, placing the parameter $P_3$ in the B-register and the parameter $P_2$ in location 604 of memory. The Fetch counter 16 has been advanced to 1505. After passing through the $S_7$ and $S_8$ states, the contents of the Fetch counter and the Return register are placed in the A-register 42. Thus the numbers 602 and 1505 are now placed in the stack in place of the program descriptor. The stack is otherwise unchanged. The base address applied by the program descriptor is transferred to the Fetch counter 16, the number 2500 being shown by way of example. The Stack counter is advanced one to 605, identifying the next location to be used in the stack portion of the core memory 10. The number 604 is transferred from the Stack counter to the Return register and then counted up two so that 606 is now stored in the Return register.

With entry into the subroutine, the program syllables of the subroutine are executed in sequence starting with the base address established in the Fetch counter 16 from the program descriptor. Operation within the subroutine is generally the same as in the main program with a few exceptions, which are described below. The same four types of program syllables are available. However, the format of the Operand Call and the Descriptor Call syllables is slightly modified in the subroutine mode.

The reason for modifying the Operand Call and Descriptor Call syllables is that in order to generalize the subroutine and make it independent of specific addresses, all Operand Call and Descriptor Call syllables are provided with an address location which is relative to the address of the return-point information placed in the stack by a subroutine entry. Operand Call and Descriptor Call syllables normally address information stored immediately below or immediately above the return-point information in the stack memory. Provision is also made for Operand Call and Descriptor Call syllables in a subroutine to address information in the subroutine program string by providing address information relative to the contents of the Fetch counter 16. This is useful in introducing constants which are normally carried as part of the subroutine program string. Also means is provided for Operand Call and Descriptor Call syllables to address specific locations in the main memory.

This modified addressing technique of executing Operand Call and Descriptor Call syllables during the subroutine operation is accomplished in the following manner. Whenever the computer is operating in the main program mode, the Return register 47 is set to zero. This condition is sensed and applied to a gate 122 (see FIG. 2) which passes an SP to one side of a flip-flop 124. When the first subroutine entry is encountered, a pulse is derived from the output of the gate 114 (see FIG. 3) called a subroutine entry pulse (SEP). This pulse is applied to the other side of the flip-flop 124 so that on encountering the first subroutine entry, the flip-flop 124 is set to its opposite state. When an Operand Call syllable or a Descriptor Call syllable is sensed by the decoder 19, a high level is applied to one input of a "logical and" gate 126 by the OC or DC lines through a "logical or" gate 128. If this occurs when the computer is in a subroutine mode, a high level is also applied to the "logical and"

gate 126 by the flip-flop 24. As a result, a gate 130 is biased open, applying the levels derived from the first three most significant digits of the address portion of the syllable in the Program register 18 to the input of a decoder 132.

The decoder 132 is arranged to produce a high level on any one of the three outputs depending upon the condition of the first three most significant digits of the address in the Program register 18. For example, if the most significant digit is a zero, operation continues in the identical manner as if the computer were in the main program mode rather than in a subroutine mode. Thus in the case of an Operand Call, as described above, the central control unit 20 advances through the $S_4$, $S_5$, and $S_6$ states, i.e., an automatic stack push down is executed, and the address portion of the syllable stored in the Program register is used to call in an operand into the A-register 42 from the core memory 10.

If the most significant digit of the address portion of the syllable stored in the Program register 18 is a one instead of a zero and the second most significant digit is a zero, the decoder 132 provides a high level on the output line designated ADD TO FETCH COUNTER—AF output line. Assuming an Operand Call syllable is being executed, the central control unit 20 is advanced to the $S_4$ state in which the Stack counter is pushed down in order to clear the A-register 42. The SP generated at the end of the $S_4$ state sets the counter of the central control unit 20 to the $S_9$ state by means of a gate 134. See FIG. 3. The gate 134 is biased open in response to the $S_4$ state and a high level on the AF line from the decoder 132 as sensed by a "logical and" circuit 136. During the $S_9$ state, shift pulses are applied to the Program register 18 through the gate 36 which is biased open by applying the $S_9$ state to the "logical or" circuit 40. The address portion of the Address register is shifted out through a gate 138 which is biased open by the $S_9$ state applied through a "logical or" circuit 140 to the gate 138. The output ofthe gate 138 is applied to the input of an adder circuit 142.

At the same time, shift pulses are applied to the Fetch counter 16 by biasing open the gate 25 in response to the $S_9$ state. The output of the Fetch counter 16 is coupled through a gate 144, biased open during the $S_9$ state, to the second input of the adder 142 through a "logical or" circuit 146. Both the contents of the Fetch counter 16 and the contents of the Program register 18 are maintained by recirculating the output back to the input. Thus the output of the gate 138 is applied through a "logical or" circuit 148 to the input of the Program register 18 and the output from the gate 144 is applied through a "logical or" circuit 150 to the input of the Fetch counter 16.

The adder 142 is arranged to produce an algebraic addition betdeen the address portion of the Program register 18 and the address carried in the Fetch counter 16. The line AF from the decoder 132 is applied to the add control input of the adder 142 through a "logical or" circuit 152. The output from the adder 142 is coupled to the address register 12 through the "logical or" circuit 24, shift pulses being applied to the Address register 12 through the gate 126 which is biased open during the $S_9$ state. In this manner, a modified address which is the sum of the base address in the Fetch counter 16 and the address portion of the Operand Call syllable in the Program register 18 is placed in the Address register 12.

The SP generated at the end of the $S_9$ state is used to set the counter or the central control unit 20 back to the $S_6$ state through a "logical and" circuit 154 which is biased open by applying the $S_9$ state thereto through a "logical or" circuit 156. See FIG. 3. In this manner, an Operand Call syllable can reference any location in the syllable string in relation to the base address of the subroutine as established in the Fetch counter 16. This arrangement is particularly useful where constants are carried as part of the subroutine and are independent of the particular program with which the subroutine is being used.

However, all subroutines require one or more parameters, which parameters will generally be different for each problem with which the subroutine is used. In order that parameters may be made available to a generalized subroutine, the parameters are placed in the stack memory to provide temporary storage addressable by the subroutine syllables. This way, the parameters may be referenced during the subroutine independently of storage location of information used or generated during the main program. Also it is desirable that some temporary storage be provided for use with a particular subroutine for storing intermediate results. Provision for storage of parameters is accomplished in the present invention by placing parameters in the stack memory below the point where return-point information is stored at the time of subroutine entry, in the manner described above. Temporary storage is set aside in the core memory 10 immediately above the location of the return-point information storage location. Referencing of parameters and temporary storage location is accomplished in the following manner.

When an Oprand Call syllable is used during the subroutine mode to call in a parameter, the first two most significant digits in the address portion of the Operand Call syllable are provided with a binary one digit. This is sensed by the decoder 132. If the third most significant digit is a zero, a high level is produced on the output line from the decoder 132 designated ADD TO RETURN REGISTER—AR. If the third most significant digit is a one, a high level is provided on the output line from the decoder 132 designated SUBTRACT FROM RETURN REGISTER—SR.

As for all Operand Call syllables, the central control unit 20 is set initially to the $S_4$ state in which the stack memory is pushed down. The central control unit 20 is then set to the $S_{10}$ state by an SP generated at the end of the $S_4$ state and passed by a gate 160. The gate 160 is open during the $S_4$ state if either the AR line or the SR line from the decoder 132 is at a high level. To this end, the AR line and the SR line are coupled through a "logical or" circuit 162 (see FIG. 3) to a "logical and" circuit 164 to which also is applied the $S_4$ state.

During the $S_{10}$ state, the address portion of the Program register 18 is shifted out by means of shift pulses applied through the gate 36. The gate 138 is biased open during the $S_{10}$ state so that the address is applied to one input of the adder 142. The adder is set to provide an algebraic sum by applying the AR line through the "logical or" gate 152 and is arranged to provide an algebraic subtraction by applying the SR line to the subtraction control input of the adder 142. Thus, depending upon which of the lines AR or SR from the decoder 132 is raised to a high level, an addition or subtraction is performed by the adder 142.

The contents of the Auxiliary Return register 119 are applied serially to the other input of the adder 142 by means of a gate 166 (see FIG. 1) on the output of the Auxiliary Return register which is biased open by the $S_{10}$ state. At the same time, shift pulses are applied to the Auxiliary Return register 119 through a gate 168 during the $S_{10}$ state. The output of the adder 142 is applied to the Address register 12 through the "logical or" circuit 24, shift pulses being applied to the Address register 12 through the gate 26 during the $S_{10}$ state. At the same time, the contents of the Auxiliary Return register 119 are circulated. In this manner, an address is generated which is greater than or less than the address stored in the Auxiliary Return register 119 by an amount determined by the address portion of the Operand Call syllable in the Program register 18.

At the end of the $S_{10}$ state, the central control unit 20 is returned to the $S_6$ state in which the contents of the resulting address location are transferred to the A-register 42 in a manner already described. In this way, all addresses in a subroutine, used as part of Operand Call and Descriptor Call syllables, can be made relative to the address location of the return-point stored in the stack memory at the time of a subroutine entry. This permits relative addressing, making the syllables in a subroutine independent of any absolute memory locations.

With the exception of examining the first three most significant digits of the address portion of Operand Call syllables and Descriptor Call syllables and modifying the address as described above, operation of all syllables in the subroutine mode is identical to operation in the main program mode. The Fetch counter 16 is advanced each time a syllable is transferred from the core memory 10 into the Program register 18.

The final syllable in the subroutine program string is used to return operation to the main program or a higher order subroutine program, the syllable being referred to as an Exit Subroutine operator. When the Exit Subroutine operator is encountered, the return-point information stored in the stack memory must be used to reset the Fetch counter 16 back to the condition it was in before the subroutine entry was made, and at the same time the Stack counter 46 and the Return register 47 must be reset to their condition at the time the Mark Stack operator was encountered so that all temporary storage and parameters associated with the subroutine are eliminated from the stack. This is accomplished in two stages. During the first stage, the return-point information stored in the stack and referenced by the address stored in the Return register 47 is used to set the Return register 47 and the Fetch counter 16 to the condition which they were in at the time the subroutine was made. At the end of the first stage, the Return register 47 contains the address of the location of the stack address stored at the time the Mark Stack operator was encountered. This information is used to restore the Stack counter 46, the Return register 47, and the Auxiliary Return register 119 to their conditions prior to the execution of the previous Mark Stack operator.

Execution of the Exit Subroutine operator is accomplished as follows. When the Exit Subroutine operator is encountered in the Program register 18, a high level is produced on a line from the decoder 41 designated the Exit Subroutine Operator—EX. Also comparison is made between the contents of the Return register 47 and the contents of the Stack counter 46 by means of a comparison circuit 170. If the contents of the Stack counter is greater than that of the Return register, the comparison 170 produces a high level on the output line designated $S>R$. Otherwise the comparison circuit 170 produces a high level on the line desginated $S=R$. If the Stack counter 46 contains an address greater than that of the Return register 47, the return-point information (originally placed in the stack by a subroutine entry initiated by a program descriptor) is in the core memory 10 portion of the stack memory and must be referenced through the Address register 12. However, if the contents of the Stack counter 46 is equal to that of the Return register 47, the return-point information is in the B-register 44. Normally, the result of the computation of the subroutine will be stored in the A-register 42 at this time.

Assuming the return-point information is in the core memory 10 and therefore the $S>R$ line is at a high level at the output of the comparison circuit 170, the central control unit 20 is set to the $S_{11}$ state by the SP generated at the end of the $S_2$ state and passed through a gate 172. See FIG. 3. The gate 172 is biased open by the output of a "logical and" circuit 174 to which is applied the line from the $S_2$ state, the line EX from the decoder 41 and the $S>R$ line from the comparison circuit 170. During the $S_{11}$ state, the address in the Return register 47 is transferred to the Address register 12 by opening a gate 173. At the same time, shift pulses are applied to the Return register 47 through the gate 66 which is biased open during the $S_{11}$ state applied through the "logical or" circuit 68. Also shift pulses are applied through the gate 26 to the Address register 12, the gate 26 being biased open during the $S_{11}$ state applied through the "logical or" circuit 28. The SP at the end of the $S_{11}$ state is applied to the "Read" input of the core memory 10 through the gate 29, placing the return-point information into the Memory register 14. At the same time, the central control unit 20 is automatically advanced to the $S_{12}$ state.

During the $S_{12}$ state, the contents of the Memory register 14 are transferred to the B-register 44. Since the A-register 42 contains the final result of the subroutine operation, the contents of the B-register 44 are no longer of interest. Transfer is effected by biasing open the gate 80 during the $S_{12}$ state through the "logical or" circuit 82. At the same time, shift pulses are applied to the Memory register 14 through the gate 34 into the B-register 44 through the gate 84. At the end of the $S_{12}$ state, the return-point information is located in the B-register 44 and the central control unit 20 is automatically advanced to the $S_{13}$ state.

In the event that the comparison circuit 170 showed that the contents of the Stack counter 46 were equal to the contents of the Return register 47 at the time the Exit Subroutine operator was placed in the Program register 18, the central control unit 20 is immediately set to the $S_{13}$ state, thus skipping the $S_{11}$ and $S_{12}$ states described above. This is accomplished by applying an SP through a gate 176 (see FIG. 3) for setting the central control unit 20 to the $S_{13}$ state. The gate 176 is biased open by the output of a "logical and" circuit 178 to which is applied the $S_2$ state from the central control unit 20, the EX line from the decoder and the $S=R$ line from the comparison circuit 170.

During the $S_{13}$ state, the Fetch counter 16 is reloaded from the B-register 44. To this end, the required number of DP's are applied to the shift input of the B-register through the gate 84 which is biased open during the $S_{13}$ state and the Fetch counter is shifted by DP's applied through the gate 25 which is also biased open during the $S_{13}$ state. The gate 118 is also biased open during the $S_{13}$ state, permitting transfer from the B-register 44 into the Fetch counter 16. In this manner, the address of the next syllable in the main program string or higher order subroutine is re-established in the Fetch counter 16.

After the next SP advances the central control unit 20 to the $S_{14}$ state, the balance of the contents of the B-register 44, namely, the Mark Stack return-point information, is transferred from the B-register 44 into the address register 12 and also to the Stack counter 46. To this end, additional shift pulses are applied through the gate 84 to the B-register 44 to the Stack counter 46 through the gate 52 and to the Address register 12 through the gate 56. The information shifted out of the B-register 44 is passed by a gate 180 which is biased open during the $S_{14}$ state. The output of the gate 180 is coupled to the input of the Stack counter 46 and to the input of the Address register 12 through the "logical or" circuit 24. The SP generated at the end of the $S_{14}$ state is applied to the "Read" input of the core memory 10 through the gate 29, transferring the return-point information placed in the stack by the Mark Stack operator in the Memory register 14.

With the central control unit 20 advanced to the $S_{15}$ state, the contents of the Memory register 14 are transferred to the Return register 47. To this end, shift pulses are applied to the Memory register 14 through the gate 34 and to the Return register 47 through the gate 66. The output from the Memory register 14 is coupled to the input of the Return register 47 through the "logical or" circuit 60 and the gate 62, the latter being biased open during the $S_{15}$ state through the "logical or" circuit 64. The Return register 47 is now placed in the condition in which it was in prior to the execution of the Mark Stack operator at the beginning of the subroutine entry operation. The Auxiliary Return register 119 is reset to the new value in the Return register 47 by the SP at the end of the $S_{15}$ state by applying the $S_{15}$ state to the "logical and" circuit 123.

Since the B-register 44 is now empty, an automatic push up of the stack memory is executed during the $S_{16}$ and $S_{17}$ states of the central control unit 20. It should be noted that the Stack counter is restored to the address of the return-point information for the Return register 47. The information stored immediately below this in the stack memory is the last entry made to the stack memory during the main program prior to the Mark Stack operator. Therefore, the SP at the end of the $S_{15}$ state is used to count the Stack counter down one. This is accomplished by biasing open a gate 182 by the $S_{15}$ state and passing the SP to Count Down input of the Stack counter 46. The address in the Stack counter now corresponds to the prior entry placed in the stack before the Mark Stack operator was encountered.

During the $S_{16}$ state, the contents of the Stack counter 46 are transferred to the Address register 12 by applying shift pulses through the gate 52 to the Stack counter 46, biasing open the gate 56, and applying shift pulses to the Address register 12 through the gate 26. The SP generated at the end of the $S_{16}$ state is applied to the "Read" input of the core memory 10 through the gate 29, thereby transferring the address information from the core memory 10 into the Memory register 14.

During the $S_{17}$ state of the central control unit 20, the prior entry information is transferred from the Memory register 14 into the B-register 44. This is accomplished by applying shift pulses through the gate 34 which is biased open during the $S_{17}$ state through the "logical or" circuit 38. Also shift pulses are applied to the B-register 44 through the gate 84, and the gate 80 is biased open during the $S_{17}$ state. The SP at the end of the $S_{17}$ state rests the central control unit 20 through the gate 101. The computer is now ready for fetching the next program syllable in the main program.

The execution of the Exit Subroutine operator is summarized in FIGURE 5 which shows the condition of the registers and the stack memory at the time the Exit Subroutine operator is placed in the Program register 18, at the intermediate stage and at the final stage. Just before the start of the Exit Subroutine operation, the result calculated by the subroutine normally would be in the A-register. If any temporary storage was set aside, this would be in the B-register and in the top positions of the stack. However, in the examples shown, it is assumed that no temporary storage is set aside, so that the return-point information entered at the time of the subroutine entry by the program descriptor is located in the B-register. The parameters $P_1$, $P_2$, and $P_3$ occur in the top three positions of the stack followed by the return-point information placed in the stack by the Mark Stack operator. The Fetch counter holds the address of the Exit Subroutine operator, which, by way of example only, is given as address location 2520. The Stack counter indicates the next location in the stack memory to be used in a push down operation, and the Return register stores the address of the return-point information in the stack memory, which, in this case, is location 606, the place where the return-point information in the B-register would be stored if it were transferred to the core memory.

During the first stage of the Exit Subroutine operation, the return-point information in the B-register is transferred in part to the Fetch register; in the example shown, this is the address location 1505 which is the location of the next program syllable in the main program. The balance of the return-point information, namely 602, is placed in the Stack counter. This is used to address the return-point established in the stack memory by the previous Mark Stack operator. During the final stage, the Stack counter is counted down one, and the contents of the location 602 in the stack memory are transferred to the Return register, namely 000, and an automatic push up is executed so that the prior entry stored in location 601 of the stack memory is placed in the B-register.

The computer is now back in the same condition it was in prior to the subroutine operation except that the result of the subroutine operation is in the A-register. In the example given, the computer is back to operation in the main program mode. In this case, the flip-flop 124 is reset by the SP at the end of the $S_{15}$ state by virtue of the 000 condition of the Return register 47. However, the operation by an Exit Subroutine may effect a return to a higher order subroutine from a lower order subroutine when nested subroutines are employed. In this case, the flip-flop 124 is not reset and the subroutine mode continues. It will be noted that all parameters and temporary storage for a particular subroutine are eliminated from the stack memory when an exit from the subroutine is made.

What is claimed is:

1. In an internally programmed computer in which groups of program control signals are stored in sequential locations of an addressable memory, apparatus for automatically introducing stored subroutines in which the program control signals for each subroutine are stored in sequential locations of the addressable memory starting with a designated base address location, said apparatus comprising a program register, a program fetch counter, means including the counter for transferring groups of program control signals in sequence from the memory to the program register, a temporary storage facility including a plurality of addressable storage locations, first and second registers, and a bidirectional address counter for selecting the storage locations in predetermined sequence, first control means when activated transferring a group of signals from the first register to the second register, transferring a group of signals from the second register to the location in the storage facility designated by the condition of the address counter and advancing the counter by one, second control means when activated reducing the counter by one and transferring a group of signals from the location designated by the counter to the second register, a return-point register, means responsive to a particular group of control signals stored in the program register for transferring a group of information signals from a selected location in memory to the first register, and third control means responsive to a particular group of signals stored in the first register for transferring a portion of said group of information signals in the first register to the fetch counter, transferring the signals stored in the fetch counter and the return-point register to the temporary storage facility, and setting the return-point register in response to the signals stored in the address counter, the group of signals transferred from the first register to the fetch counter designating the base address of a subroutine stored in the memory.

2. In an internally programmed computer in which groups of program control signals are stored in sequential locations of an addressable memory, apparatus for automatically introducing stored subroutines in which the program control signals for each subroutine are stored in sequential locations of the addressable memory starting with a designated base address location, said apparatus comprising a program register, a program fetch counter, means including the counter for transferring groups of program control signals in sequence from the memory to the program register, a temporary storage facility including a plurality of addressable storage locations, first and second registers, and a bidirectional address counter for selecting the storage locations in predetermined sequence, first control means when activated transferring a group of signals from the first register to the second register, transferring a group of signals from the second register to the location in the storage facility designated by the condition of the address counter and advancing the counter by one, second control means when activated reducing the counter by one and transferring a group of signals from the location designated by the counter to the second register, a return-point register, means activated in response to a particular group of signals stored in the program register for setting the fetch counter to a count condition determined by a first portion of the group of signals in the storage location of the temporary storage facility designated by the address signals produced by the return-point register, means activated in response to the same group of signals in the program register for setting the address counter to a count condition determined by a second portion of the group of signals in the storage location designated by the same address signals produced by the return-point register, and means for setting the return-point register to a count condition determined by the group of signals stored in the temporary storage facility at the address location designated by said second signal group portion.

3. In an internally programmed computer in which groups of program control signals are stored in sequential locations of an addressable memory, apparatus for automatically introducing stored subroutines in which the program control signals for each subroutine are stored in sequential locations of the addressable memory starting with a designated base address location, said apparatus comprising a program register, a program fetch counter, means including the counter for transferring groups of program control signals in sequence from the memory to the program register, a temporary storage facility including a plurality of addressable storage locations, first and second registers, and a bidirectional address counter for selecting the storage locations in predetermined sequence, first control means when activated transferring a group of signals from the first register to the second register, transferring a group of signals from the second register to the location in the storage facility designated by the condition of the address counter and advancing the counter by one, second control means when activated reducing the counter by one and transferring a group of signals from the location designated by the counter to the second register, a return-point register, third control means for transferring a first portion of a group of signals from the second register to the fetch counter, fourth control means for transferring a second portion of a group of signals from the second register to the address counter to reset the counter, fifth control means for resetting the return-point register in response to the group of signals stored in the location in the temporary storage facility designated by the address counter, and means responsive to a particular group of signals stored in the program register for activating in sequence the third, fourth, and fifth control means.

4. In an internally programmed computer in which groups of program control signals are stored in sequential locations of an addressable memory, apparatus for automatically introducing stored subroutines in which the program control signals for each subroutine are stored in sequential locations of the addressable memory starting with a designated base address location, said apparatus comprising a program register, a program fetch counter, means including the counter for transferring groups of program control signals in sequence from the memory to the program register, a temporary storage facility including a plurality of addressable storage locations, first and second registers and a bidirectional address counter for selecting the storage locations in predetermined sequence, first control means when activated transferring a group of signals from the first register to the second register, transferring a group of signals from the second register to the location in the storage facility designated by the condition of the address counter and advancing the bidirectional counter by one, second control means when activated reducing the bidirectional counter by one and transferring a group of signals from the location designated by the bidirectional counter to the second register, a return-point register, third control means when activated transferring the signals stored in the return-point register to the first register of the storage facility, fourth control means when activated transferring the signals stored in the address counter to the return-point register, and means responsive to a particular group of control signals stored in the program register for activating the first control means, the third control means, and the fourth control means in sequence.

5. In an internally programmed computer in which stored groups of program control signals are used in sequence to control the computer, apparatus for introducing stored standard subroutines in which predetermined groups of control signals are used in sequence to perform special computations, comprising a temporary storage facility including means for storing electrically coded groups of signals in addressable storage locations, and means for recording, sensing, and reading out groups of signals from any selected storage location of the storing means, a bidirectional address counter, means for advancing the address counter whenever a group of signals is recorded in the storing means, means for regressing the address counter whenever a group of signals is read out of the storing means, a return-point register, means including a fetch counter for addressing and sensing any selected group of control signals from said stored groups of control signals, the group selected being controlled by the fetch counter, and means responsive to the control signal sensing means when a particular group of control signals is sensed for transferring the signals of the return-point register to the temporary storage facility, and setting the return-point register from the address counter to the address of the signals transferred to the temporary storage facility.

6. In a computer in which a main program consisting of a string of control signal groups, each group controlling some predetermined operation by the computer, and a plurality of standard subroutine programs each consisting of a string of control signal groups are stored in addressable locations in a main storage facility, the computer automatically addressing and sensing the control signal groups in a predetermined sequence, apparatus for transferring operation from the main program string to a subrountine string, from one subroutine string to another, back through each subroutine entered to the main program in the reverse order in which they were entered, said apparatus comprising a temporary storage facility including means for automatically reading information out of the facility in the reverse order in which it is recorded in the facility, a register for storing a group of signals designating the address of the next group of control signals to be sensed in the main storage facility, means responsive to the sensing of a particular group of control signals indicative of a subroutine entry for transferring the contents of said register to the temporary storage facility and substituting a new group of signals indicative of the address in the main storage facility of the first group of signals in the desired subroutine string, and means responsive to the sensing of a particular group of control signals indicative of a subroutine exit for transferring the contents of said register last placed in the temporary storage facility from the temporary storage facility back to the register, whereby the operation of the computer is restored to the main program string or subroutine string interrupted by the subroutine entry control signals.

7. In a computer in which a main program consisting of a string of control signal groups, each group controlling some predetermined operation by the computer, and a plurality of standard subroutine programs each consisting of a string of control signal groups are stored in addressable locations in a main storage facility, the computer automatically addressing and sensing the control signal groups in a predetermined sequence, apparatus for transferring operation from the main program string to a subroutine string, from one subroutine string to another, back through each subroutine entered to the main program in the reverse order in wihch they were entered, said apparatus comprising a temporary storage facility including means for automatically reading information out of the facility in the reverse order in which it is recorded in the facility, a register for storing a group of signals designating the address of the next group of control signals to be sensed in the main storage facility, and means responsive to the sensing of a particular group of control signals indicative of a subroutine entry for transferring the contents of said register to the temporary storage facility and substituting a new group of signals indicative of the address in the main storage facility of the first group of signals in the desired subroutine string.

8. In a computer in which a main program consisting of a string of control signal groups, each group controlling some predetermined operation by the computer, and a plurality of standard subroutines each consisting of a string of control signal groups are stored in addressable locations in a main storage facility, apparatus comprising a temporary storage facility including means for reading or recording groups of signals in addressable locations of the storage facility, an address counter associated with the temporary storage facility, means for addressing a location in the temporary storage facility in response to the contents of the counter, means for advancing the counter by one when information is recorded in the selected location and reducing the counter by one when information is read from the selected location, a return address register, means for addressing a location in the temporary storage facility in response to the contents of the return address register, first means responsive to a control signal group from the main storage indicative of a subroutine entry for effecting the transfer of the contents of the return address register to a location in the temporary storage facility determined by the address counter and for setting the return address register from the signals stored in the address counter, and second means responsive to a control signal group from the main storage indicative of a subroutine exit for setting the address counter from the signals stored in the location in the temporary storage facility determined by the return address register.

9. Apparatus as defined in claim 8 further comprising means including a fetch counter for addressing and sensing the control signal groups in the main storage facility, said second means responsive to a control signal group further including means for setting the fetch counter from the signals stored in the location in the temporary storage facility determined by the return address register.

10. Apparatus as defined in claim 8 further comprising means including a fetch counter for addressing and sensing the control signal groups in the main storage facility, said first means responsive to a control signal group further including means responsive to the same control signal group indicative of a subroutine entry for effecting transfer of the contents of the fetch counter to the location in the temporary storage facility determined by the address counter.

11. In a computer in which a main program consisting of a string of control signal groups, each group controlling some predetermined operation by the computer, and a plurality of standard subroutines each consisting of a string of control signal groups are stored in addressable locations in a main storage facility, apparatus comprising a temporary storage facility including means for reading or recording groups of signals in addressable locations of the storage facility, an address counter associated with the temporary storage facility, means for addressing a location in the storage facility in response to the contents of the counter, means for advancing the counter by one when information is recorded in the selected location and reducing the counter by one when information is read from the selected location, a return address register, means for addressing a location in the temporary storage facility in response to the contents of the return addresss register, and first means responsive to a control signal group from the main storage indicative of a subroutine entry for effecting the transfer of the contents of the return address register to a location in the temporary storage facility determined by the address counter and for setting the return address register from the signals stored in the address counter.

12. Apparatus as defined in claim 11 further comprising means including a fetch counter for addressing and sensing the control signal groups in the main storage facility, said first means responsive to a control signal group further including means responsive to the same control signal group indicative of a subroutine entry for effecting transfer of the contents of the fetch counter to the location in the temporary storage facility determined by the address counter.

References Cited in the file of this patent

UNITED STATES PATENTS

| | | |
|---|---|---|
| 3,012,723 | Goertzel et al. | Dec. 12, 1961 |

FOREIGN PATENTS

| | | |
|---|---|---|
| 803,734 | Great Britain | Oct. 29, 1958 |